3,447,125
MULTI-FREQUENCY PHASE SHIFTER
James A. Peugh, 3415 Yosemite St.,
San Diego, Calif. 92109
Filed Sept. 27, 1967, Ser. No. 671,158
Int. Cl. H04b 13/00
U.S. Cl. 340—5    4 Claims

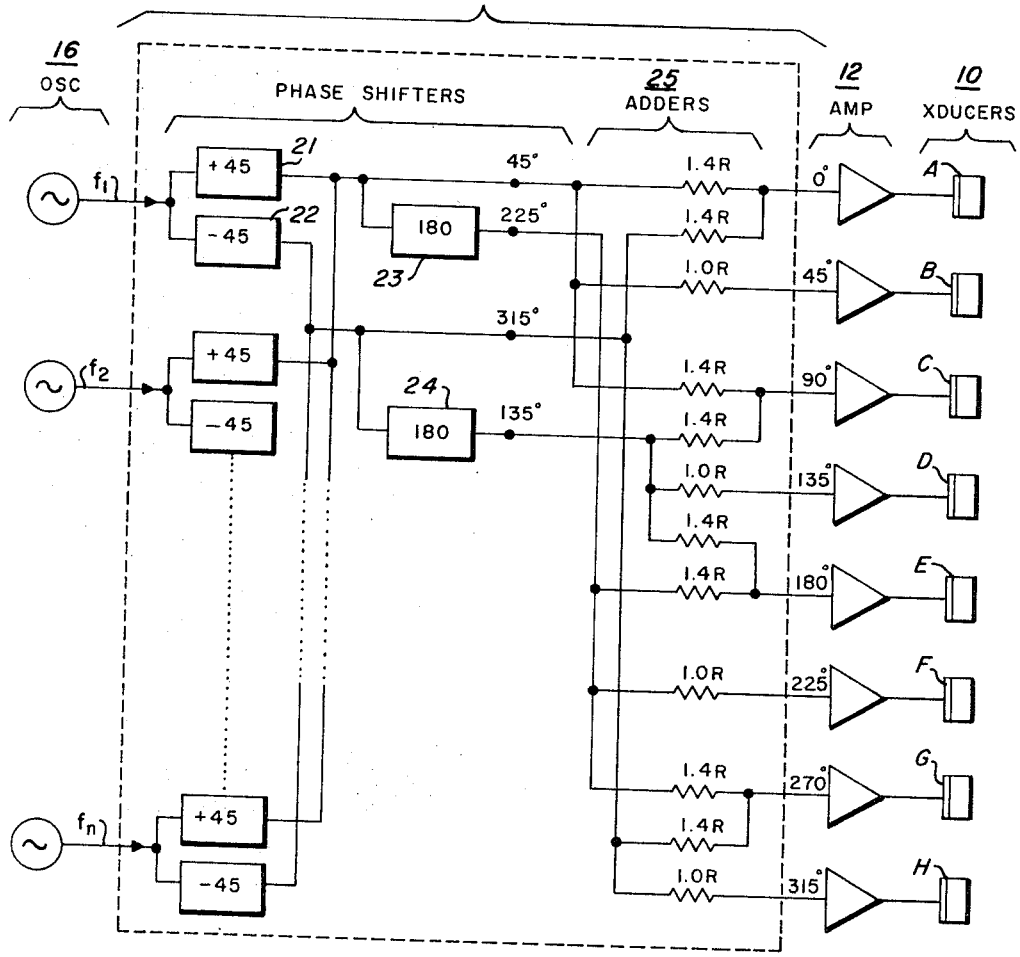
FIG. 1
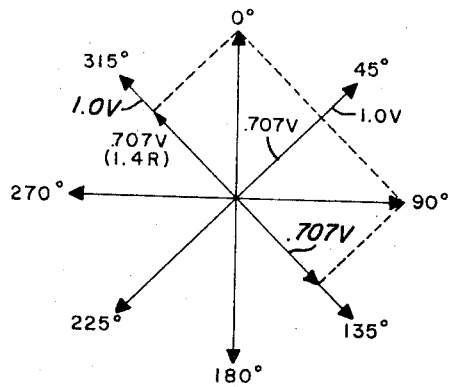
FIG. 2
INVENTOR.
JAMES A. PEUGH
BY 
ATTORNEYS

United States Patent Office 3,447,125
Patented May 27, 1969

ABSTRACT OF THE DISCLOSURE

The direction of a tunable receiver is determined with respect to the center line of a linear array of transducers at a transmitting station by detecting the frequency of the maximum signal level at the receiver. At the transmitting station is a source of a series of frequencies, each frequency being divided into components of uniformly spaced phases, the frequencies of like phases being applied, respectively, to said transducers to form a plurality of differently directed beams. Each beam is unique as to frequency and can be identified at the tunable receiver.

The invention described herein may be manufactured and used by or for the Government of the United States of America for governmental purposes without the payment of any royalties thereon or therefor.

*Prior art.*—It is known in sonar that the direction of a remote point source of signal can be determined at a receiving station by detecting the signal at each of an array of hydrophones, and shifting the phase of each signal an optimum amount, for a given direction, to bring all signals into phase. The amount of phase shift is related to the direction of the received signal. In such systems the rather bulky phase shifting networks are located at the receiving station. In some cases it is desirable to place the phase shifting networks at the transmitter so that any tunable receiver could identify the beam by its frequency and hence identify its position with respect to the array at the transmitter.

The object of this invention is to provide an improved direction finding system.

A more specific object of this invention is to provide a direction finding system in which a transducer array and the phase shifting networks are located at the signal source rather than at the receiver.

A still more specific object of this invention is to provide a simplified phase shifting system.

*Summary.*—The objects of this invention are attained by providing a transmitting station with the usual array of uniformly spaced transmitting transducers and with sources of frequency $f_1, f_2 \ldots f_n$. Each frequency is shifted in phase a plurality of steps so as to produce a series of voltages displaced equal increments of phase. The voltages of the series are applied, respectively, to the transducers of the array. The number of transducers is equal to or a multiple of the number of increments of phase. It will be shown that from the array is transmitted a plurality of beams each characterized by one of the frequencies $f_1$ to $f_n$, and each directed in a different direction. A tunable receiver at a remote point can identify the beam in which the receiver may be located and hence identify the angular position of the center line of the array with respect to the line to the receiver.

Other objects and features of this invention will become apparent to those skilled in the art by referring to the specific embodiments described in the following specification and shown in the accompanying drawing in which:

FIG. 1 is a block diagram of one preferred embodiment of this invention.

FIG. 2 is a rotating vector diagram of the signal voltages at the several transducers of the array of FIG. 1.

In FIG. 1 is shown an array 10 of transmitting transducers. In this embodiment the array is assumed to be in-line or linear. The transducers A to H, inclusive, are eight in number, although this number is not critical. As will be shown, the minimum number of transducers is determined primarily by the number of increments of phase into which the signal may be conveniently divided. For increased beam resolution, transducers can be added onto the end of the array shown, each added transducer being connected in parallel with the corresponding transducer A to H of the first group.

Figure 3:
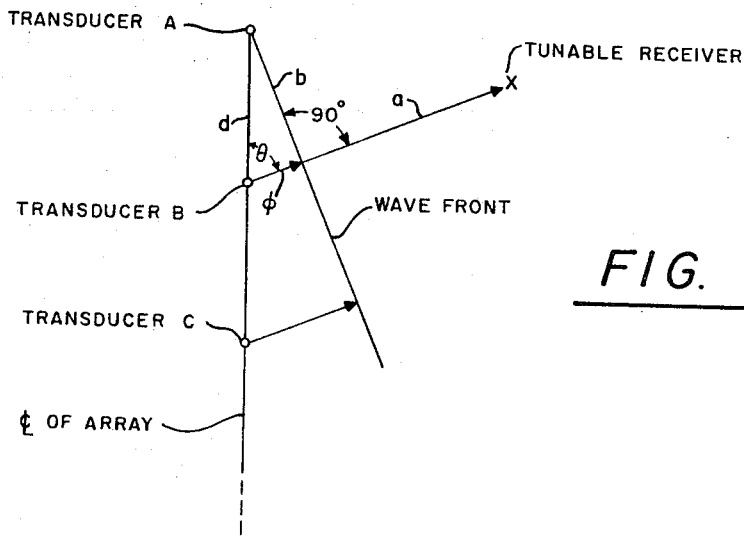
FIG. 3 is a geometric diagram of the wave front producing array of FIG. 1.

In FIG. 3 is shown the simple geometry involved in producing and transmitting a so-called beam. The direction from the array to the receiver is shown by line $a$, and the angle of line $a$ with the center line of the array is angle $\theta$. The line $b$ is drawn through one transducer, (A), which will be referred to as the reference transducer, and is drawn perpendicular to the line $a$ to the receiver. Signals from all of the transducers must arrive in phase at line $b$ to produce the beam or strongest signal at any receiver along line $a$. The distance from transducer B to line $b$, can be in terms of phase displacement between the signal at transducers A and B to meet the in-phase requirement at the wave front. From the right angle triangle at FIG. 3 the following expression can be written $$\cos \theta = \frac{C\phi}{2\pi f d}$$

where C is the velocity of sound in water, $d$ is the distance between transducers A and B, and $f$ is the frequency of the signal applied to the transducers. A similar expression can be written for the triangle involving transducer C where the distance now is $2d$ instead of $d$. Since C and $2\pi$ are fixed and $\phi$ can be assumed to be constant the angle $\theta$ can be equated to frequency $f$ as $\cos\theta = K/f$. That is to say, for the given direction $\theta$ there is but one frequency, $f$, which will create a beam in that direction. For a different position of the receiver and for a different angle $\theta$, another frequency $f$ is required.

As stated, the distance $\phi$ is a measure in degrees or radians of the phase of the electrical signal required at a transducer B with respect to the signal at transducer A. Let it be assumed that this phase is 45 degrees for each transducer with respect to the next adjacent transducer. If eight transducers are assumed in the array then eight increments of phase, or 360° total is required. The phase increments and the number of transducers may be selected at will.

In FIG. 1, $n$ generators 16 are shown for generating frequencies $f_1$ to $f_n$. The number of frequencies correspond to the number of beams desired to be transmitted from the array. At 20 is shown in block diagram one specific network for producing eight equally spaced phases for each of the $n$ frequencies of generators 16. To produce the eight 45-degree increments, quadrature voltages are first produced for each frequency. Then each of the 90-degree voltages are split, or reversed, to produce two additional phases, and finally the four phases are vectorally added to produce eight phases. More specifically, each frequency input is connected to two phase shifters, 21 and 22. The phase can be advanced 45 degrees, in shifter 21, with a simple series condenser and resistor, as well known. The same frequency also can be retarded 45 degrees, in shifter 22, by a similar series reactance network. Alternatively, the 90° shift can be made in a single network. Similar phase shifters are connected to the output of each of the frequency sources 16. The leading voltages are all connected together and the lagging voltages are all connected together and are, respectively, applied to the phase spliting devices 23 and 24. Assuming a reference or zero phase at the frequency source, the output of shifter 21 is then +45 degrees and can be applied directly to the "45" terminal. If the +45 degree voltage is reversed in phase in device 23 a phase of 225 degrees is produced whereas the lagging 45 degree voltage or +315 degrees is reversed in phase to produce a 135 degree voltage. In the vector diagram of FIG. 2 is shown the four voltages of phases 45 degrees, 135 degrees, 225 degrees, and 315 degrees.

According to this invention any number of additional voltages with intermediate phases are obtained by vectorally adding appropriate pairs of the first four voltages. If, for example, equal amounts of the 45 and 135 degree voltages are added, a 90 degrees voltage is obtained. If the four principal voltages are unity in magnitude the vectoral addition can be accomplished to obtain unity voltage on the 90 degree vector by adding .707 volts from each of the adjacent vectors. At 25 is shown resistance type adding circuits for producing the eight phase voltages, although reactive circuits could be employed. To produce the normalized or 1.0 and .707 volts, the resistances must be 1.0 or 1.4 units of resistance, R.

For example, the 45 degree voltage applied to transducer B is obtained directly from the 45 degree point in the phase splitter through a 1.0 R resistor, and the normalized one volt signal is appropriately amplified at 12 and applied to the transducer B. The zero phase for the transducer A, however, must be obtained by vectorally adding the 45 and the 315 degree voltages through 1.4 R resistors which when added as shown in FIG. 2 produces the normalized one volt signal, which also is amplified appropriately in amplifier 12 and applied to transducer A. Similar additions are required for the 90, 180, and 270 degree components.

Since the distance $\phi$, in FIG. 3 is a direct function of the signal frequency, the in-phase additions of the several transducers of the array along the wave can be accomplished at only one frequency, $f$, for one direction $\theta$. It follows that the tunable receiver at the remote point can determine which beam it is on by tuning to the strongest signal and noting the frequency of that signal. The tuning dial could, conveniently, be calibrated in terms of direction $\theta$.

Figure 4:
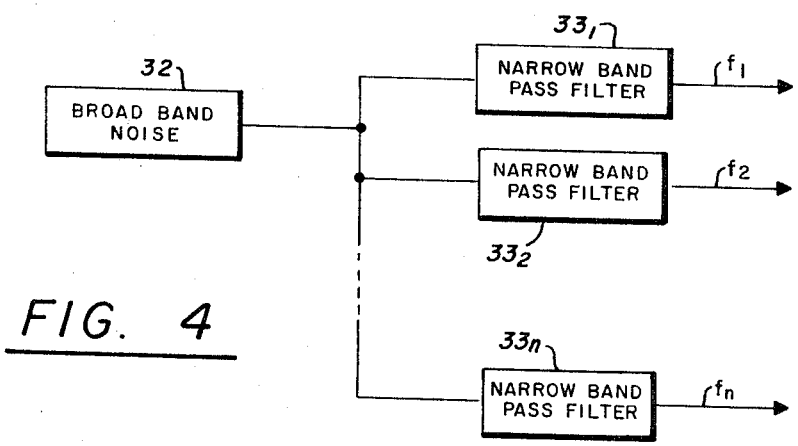
FIG. 4 is an alternative signal source adapted to the system of FIG. 1.

Instead of separate generators 16, a single broad band noise source 32 may be employed as shown in FIG. 4. Then, with a series of differently tuned narrow band pass filters 33 the several frequencies $f_1$ to $f_n$ can be isolated. Such frequencies should of course be leveled in amplitude, whereupon they can be divided into phase components and added as in FIG. 1.

What is claimed is:
1. A directional transmitting system comprising;
a linear array of uniformly spaced transducers,
sources of frequencies, $f_1, f_2 \ldots f_n$,
phase shifting means connected to each of said sources for shifting the phase of each frequency through a plurality of increments of electrical degrees and applying, to a separate conductor all voltages of said frequencies of one phase, the number of increments of phase corresponding to the number of transducers in said array,
said conductors being connected, respectively, to different transducers so that the direction of each of a plurality of beams formed by said array is a function of one of said frequencies,
said phase shifting means comprising a phase shifting network connected to each frequency source for dividing each source frequency into two voltages of two different predetermined phases,
means for combining all frequencies of like phase,
a phase splitter means connected to each combining means for generating two phase-opposed components from each voltage of said two predetermined phases, and
means for vectorially adding pairs of voltages of different phases for producing voltages of phases intermediate the phases of the added pairs.

2. A directional transmitting system comprising;
a linear array of uniformly spaced transducers,
sources of frequencies, $f_1, f_2 \ldots f_n$,
phase shifting means connected to each of said sources for shifting the phase of each frequency through a plurality of increments of electrical degrees and applying, to a separate conductor all voltages of said frequencies of one phase, the number of increments of phase corresponding to the number of transducers in said array,
said conductors being connected, respectively, to different transducers so that the direction of each of a plurality of beams formed by said array is a function of one of said frequencies,
said phase shifting means comprising a phase-shifting network connected to each frequency source for generating two quadrature voltages,
means for combining all frequencies of like phase,
a phase splitter connected to each combining means for generating four quadrature voltages, and
means for vectorially adding voltages of adjacent phases for generating four additional quadrature voltages.

3. A directional transmitting system comprising
a linear array of uniformly spaced transducers,
sources of a signal voltages of progressively different frequencies,
a first group of phase shifters, said shifters being connected, respectively, to the outputs of said sources for generating two alternating current voltages substantially in quadrature at the frequency of the connected source,
two conductors connected, respectively, to output terminals of each phase shifters, of voltages of like phase,
two phase splitters connected, respectively, to said conductors for generating at four output terminal a first group of four quadrature voltages for each frequency,
means for adding equal proportions of said first group of four voltages of adjacent phases for producing a second group of quadrature voltages, and
means for applying each of the first and second groups of voltages to successive transducers of said array for projecting a plurality of differently directed beams, each beam being identifiable by one of said different frequencies.

4. In the directional transmitting system defined in claim 3, said sources of signal voltages comprising
a broad band noise generator,
a plurality of narrow band pass filters coupled in multiple to the output of said noise generator,
said filters having pass bands centered, respectively, at said progressively different frequencies.

References Cited

UNITED STATES PATENTS 3,311,869  3/1967  Klund _____ 340—5

RICHARD A. FARLEY, *Primary Examiner.*

U.S. Cl. X.R.

340—6; 343—100